(12) United States Patent
Gouma et al.

(10) Patent No.: US 11,318,996 B2
(45) Date of Patent: May 3, 2022

(54) VEHICLE ROOF STRUCTURE

(71) Applicants: Nissan North America, Inc., Franklin, TN (US); NISSAN MOTOR CO., LTD., Yokohama (JP)

(72) Inventors: Masahiro Gouma, Zama (JP); Patrick Grattan, Wixom, MI (US)

(73) Assignees: NISSAN NORTH AMERICA, INC., Franklin, TN (US); NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 17/016,180

(22) Filed: Sep. 9, 2020

(65) Prior Publication Data

US 2022/0073147 A1 Mar. 10, 2022

(51) Int. Cl.
*B62D 25/06* (2006.01)
*B60R 9/04* (2006.01)
*B62D 27/02* (2006.01)

(52) U.S. Cl.
CPC ............. *B62D 25/06* (2013.01); *B60R 9/04* (2013.01); *B62D 27/02* (2013.01); *B62D 27/023* (2013.01)

(58) Field of Classification Search
CPC ....... B62D 25/06; B62D 27/02; B62D 27/023
USPC ................... 296/203.01, 203.03, 210, 1.03
See application file for complete search history.

(56) References Cited

U.S. PATENT DOCUMENTS

| | | | |
|---|---|---|---|
| 6,397,553 B1 | 6/2002 | Horikawa et al. | |
| 6,578,909 B1 | 6/2003 | Reed et al. | |
| 7,296,850 B2 * | 11/2007 | Kaneda | B60R 13/0815 296/210 |
| 7,703,840 B2 * | 4/2010 | Fukunaga | B60R 13/0815 296/190.07 |
| 7,758,107 B2 | 7/2010 | Ratsos et al. | |
| 8,042,863 B2 | 10/2011 | Nydam | |
| 8,998,307 B1 | 4/2015 | Joyce et al. | |
| 9,045,166 B2 | 6/2015 | Fellague | |
| 9,902,429 B2 | 2/2018 | Okada et al. | |
| 2004/0075299 A1 * | 4/2004 | Wieber | B60R 13/0815 296/187.02 |
| 2006/0006683 A1 * | 1/2006 | Kaneda | F16F 7/116 296/1.03 |
| 2013/0181487 A1 | 7/2013 | Krueger et al. | |

FOREIGN PATENT DOCUMENTS

| | | | | |
|---|---|---|---|---|
| CN | 105882759 A * | 8/2016 | | B62D 25/06 |
| EP | 1614927 B1 | 2/2010 | | |
| FR | 3063267 A1 | 8/2018 | | |
| WO | 2009052951 A1 | 4/2009 | | |
| WO | WO-2012040480 A2 * | 3/2012 | | B62D 29/005 |

* cited by examiner

*Primary Examiner* — Dennis H Pedder
(74) *Attorney, Agent, or Firm* — Global IP Counselors, LLP (57) ABSTRACT

A vehicle roof structure includes a roof bow, a vibration dampening plate and a weighted member attached to the vibration dampening plate. The roof bow has a forward flange section, a rearward flange section and a central section, the central section defining a recessed area. The vibration dampening plate is installed to an upper surface of the roof bow proximate the central section. A weighted member is fixedly attached to a lower surface of the vibration dampening plate such that the weighted member is at a level above the upper surface of the recessed area of the roof bow and has a non-contacting relationship with the roof bow.

16 Claims, 11 Drawing Sheets

FIG. 21

VEHICLE ROOF STRUCTURE

BACKGROUND

Field of the Invention

The present invention generally relates to a vehicle roof structure. More specifically, the present invention relates to a vehicle roof structure that includes a roof bow that includes a vibration dampening plate.

Background Information

Large sports utility vehicles (SUVs), vans and panel trucks typically have large cavernous interior spaces that may or may not be part of a passenger compartment of the vehicle. Due the large nature of such interior spaces, the rearward areas of the structure that defines the large interior space can often amplify noises, in particular in the rearward area of the interior space.

SUMMARY

One object of the present disclosure is to provide a rearward roof bow of a roof structure of a vehicle with a large interior space with a vibration dampening plate that improves and/or attenuates resonance frequency of the roof structure thereby reducing propagation of unwanted noises.

In view of the state of the known technology, one aspect of the present disclosure is to provide a vehicle roof structure that includes a roof bow, a vibration dampening plate and a weighted member. The roof bow is configured and dimension to install to opposing roof rails of a vehicle body structure. The roof bow has a first end and a second end. A first overall length of the roof bow is measured from the first end to the second end and a first overall width being measured perpendicular to the first overall length. The roof bow has a forward flange section, a rearward flange section and a central section that extend in a lengthwise direction of the roof bow between the first end and the second end. The forward and rearward directions are defined relative to a forward and rearward directions of the vehicle body structure. The central section defines a recessed area having an upper surface that is lower that respective upper surfaces of the forward and rearward flange sections. The vibration dampening plate is installed to an upper surface of the roof bow proximate the central section of the roof bow spaced apart from the first end and the second end of the roof bow. The weighted member is fixedly attached to a lower surface of the vibration dampening plate such that the weighted member is at a level above the upper surface of the recessed area of the roof bow with a non-contacting relationship with the roof bow.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
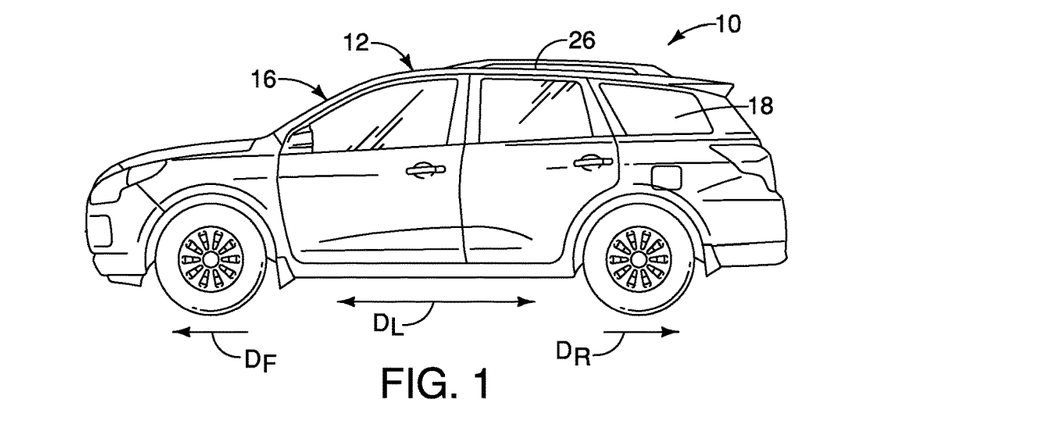
FIG. 1 is a side view of a vehicle that includes a roof structure in accordance with a first embodiment.

Referring initially to FIG. 1, a vehicle 10 having a roof structure 12 with a vibration dampening plate 14 (FIG. 3) is illustrated in accordance with a first embodiment.

The vehicle 10 is a large SUV (sports utility vehicle) that has a vehicle body structure 16 that includes, among other features, the roof structure 12. The vehicle body structure 16 also further defines a passenger compartment 18. The vehicle 10 defines a vehicle longitudinal direction $D_L$, a vehicle forward direction $D_F$ and a vehicle rearward direction $D_R$, all relative to the orientation of the vehicle 10, in a conventional manner.

Figure 2:
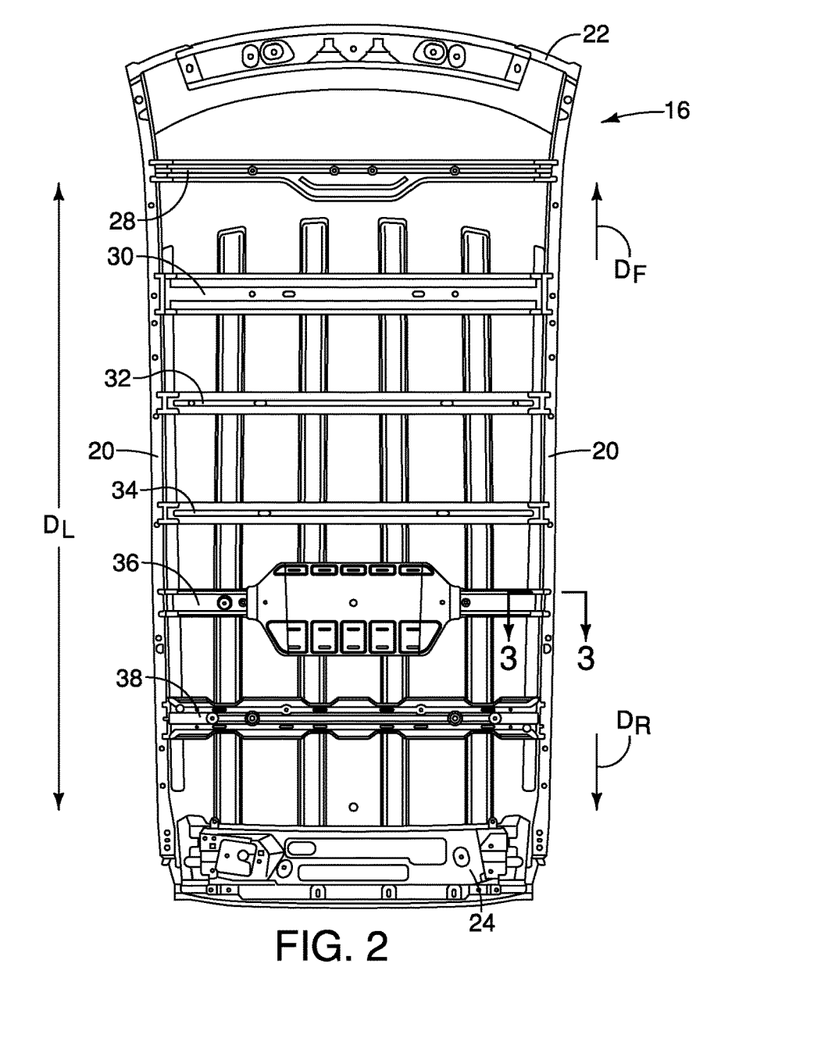
FIG. 2 is a top view of a plurality of roof bows of the roof structure with a roof panel of the roof structure removed in accordance with the first embodiment.

As shown in FIG. 2, the roof structure 12 (also referred to as the vehicle roof structure 12) includes a pair of roof side rails 20, a windshield support structure 22, a rear support structure 24, a roof panel 26 and a plurality of roof bows, such as roof bows 28, 30, 32, 34, 36 and 38.

Figure 3:
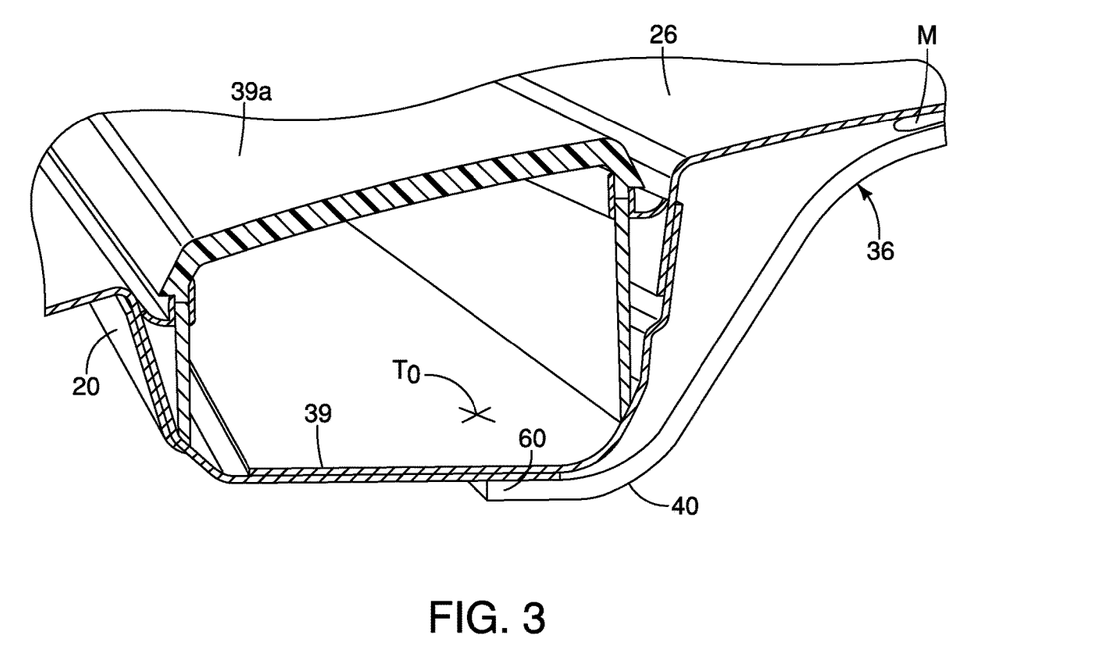
FIG. 3 is a cross-sectional view of a portion of the roof structure taken along the line 3-3 in FIG. 2 showing a roof ditch of the roof structure along with a welding connection between a side roof rail and one of the roof bows in the area of the roof ditch in accordance with the first embodiment.

The pair of roof side rails 20 extend in the vehicle longitudinal direction $D_L$ along opposite sides of the vehicle 10 from the windshield support structure 22 to the tailgate support structure 26. The pair of roof side rails 20, portions of the roof rails 20 and the roof panel 26 at least partially defining roof ditches 39 on either lateral side of the roof panel 26, as shown in FIGS. 2 and 3. The roof ditches 39 are recessed areas of the roof structure 12 where the roof panel 26 is attached to the roof side rails 20 via, for example, welding techniques. The roof ditches 39 are concealed by molding assemblies 39a, as shown in FIG. 3. Since roof side rails, roof panels, windshield support structures, tailgate support structures and roof ditches are conventional vehicle structures, further description is omitted for the sake of brevity.

As is described in greater detail below, the roof bows 28, 30, 32, 34, 36 and 38 are welded or otherwise fixedly attached to the roof side rails 20 at locations adjacent to and below the roof ditches 39 via welds $T_0$, as shown in FIG. 3.

As is described in greater detail below, the roof bows 28, 30, 32, 34, 36 and 38 are welded or otherwise fixedly attached to the roof side rails 20 at spaced apart locations, as shown in FIG. 2. The roof bows 28, 30, 32, 34, 36 and 38 are arranged as follows. The roof bow 28 is located proximate but spaced apart and rearward of the windshield support structure 22. The roof bow 30 is spaced apart and rearward of the roof bow 28. Similarly, the roof bow 32 is spaced apart and rearward of the roof bow 30. The roof bows 34, 36 and 38 are similarly spaced apart from one another with all of the roof bows 28, 30, 32, 34, 36 and 38 being forward of the rear support structure 24.

In convention SUVs or large vehicle with a long, large roof structure, the roof bows are often similar or identical, spanning the distance between side roof rails of the roof structure. In the roof structure 12 described herein below, the roof bows 28, 30, 32, 34, 36 and 38 are not identical. Rather, either one, or both, of the roof rails 36 and 38 have been redesigned in a manner that improves the overall design of the vehicle 10, as describe below.

In many large SUVs, with a large roof structure such as the roof structure 12, rear portions of the roof structure 12 can experience noises due to the resonant frequency of the structure. Put another way, the size and shape of the passenger compartment 18 can be very large and almost cavernous. Further, the roof structure 12 in such a large vehicle can experience booming noises when the top rear portion of the roof is hit or drummed on by the human hand.

Figure 4:
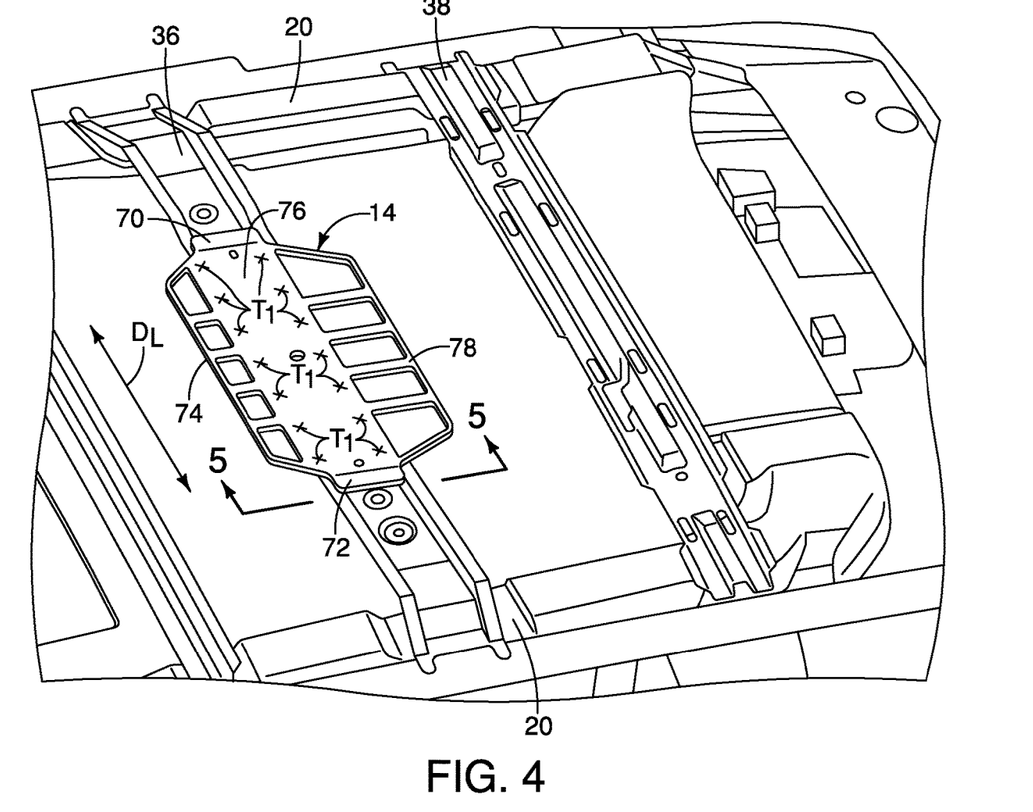
FIG. 4 is a perspective view of a rearward area of the roof structure showing the two rearmost roof bows, one of the roof bows having a vibration dampening plate attached thereto in accordance with the first embodiment.

FIG. 4 shows the roof bows 36 and 38, which are the two rearward-most ones of the roof bows 28, 30, 32, 34, 36 and 38 of the roof structure 12. By adding mass such as a vibration dampening plate 14 to either one or both of the roof bows 36 and 38, the resonance frequency of the rearward area of the roof structure 12 is altered and improved in order to reduce resonance frequency related noises and reduce the booming noises mentioned above of the vehicle 10.

It should be understood from the description herein below, that either one of the roof bow 36 or the roof bow 38 can include the vibration dampening plate 14, as described below. Hence, the description below of the roof bow 36 applies to either of the roof bows 36 and 38. However, in the first embodiment described hereinbelow, the vibration dampening plate 14 is shown to be attached to the roof bow 36.

Figure 5:
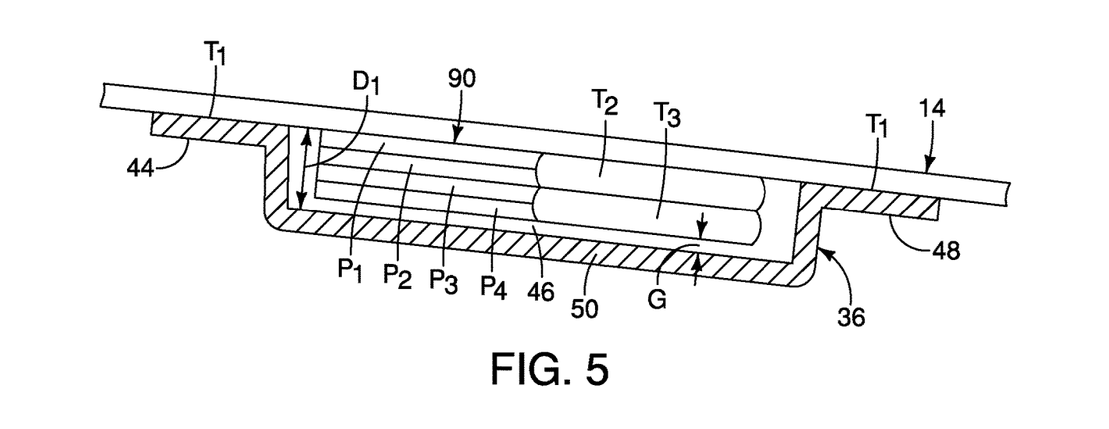
FIG. 5 is another cross-sectional view of the roof bow and the vibration dampening plate taken along the line 5-5 in FIG. 4, showing a weighted member attached to a lower surface of the vibration dampening plate in accordance with the first embodiment.
Figure 6:
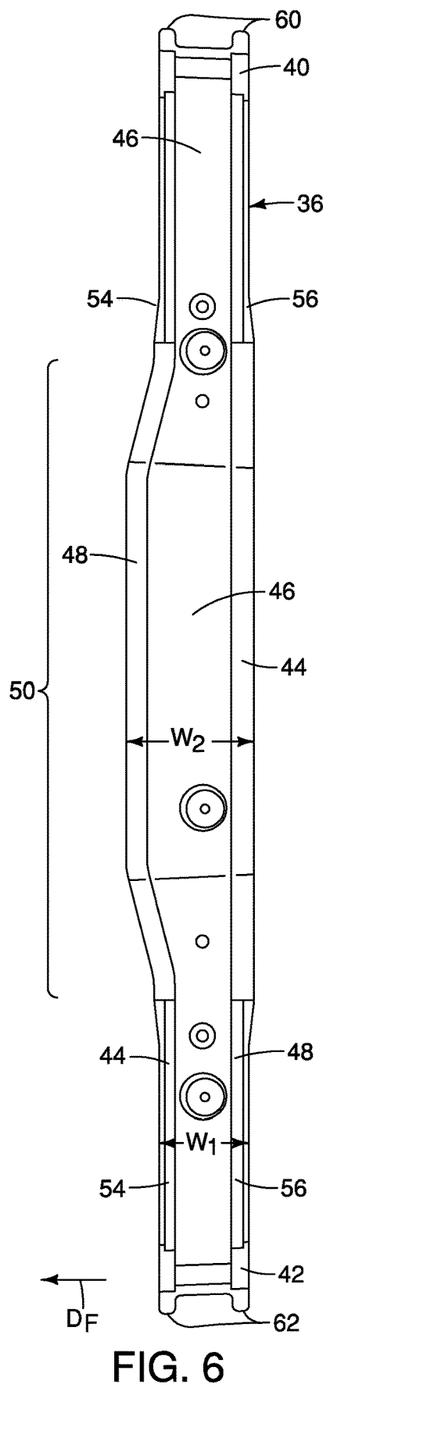
FIG. 6 is a top view of the roof bow depicted in FIGS. 4 and 5 removed from the roof structure showing a first end, a second end, a forward flange section, a recessed area and a rearward flange section in accordance with the first embodiment.

Description is now provided for the roof bow 36 with specific reference to FIGS. 4-9. The roof bow 36 includes a first end 40 and a second end 42, a forward flange section 44, a recessed area 46, and a rearward flange section 48. The roof bow 36 extends between and is supported to the pair of roof side rails 20. Specifically, the first end 40 is welded to one of the roof side rails 20 and the second end 42 is attached to the other roof side rail 20 on the opposite side of the vehicle body structure 16. As shown in FIGS. 2, 4 and 6, the roof bow 36 defines a lengthwise direction BL of the roof bow 36 that is perpendicular to the vehicle longitudinal direction $D_L$.

The forward flange section 44 extends in the vehicle forward direction $D_F$ from the recessed area 46, and the rearward flange section 48 extends in the vehicle rearward direction $D_R$ from the recessed area 46. The forward flange section 44 and the rearward flange section 48 extend in the lengthwise direction BL of the roof bow 36 between the first end 40 and the second end 42.

Figure 8:
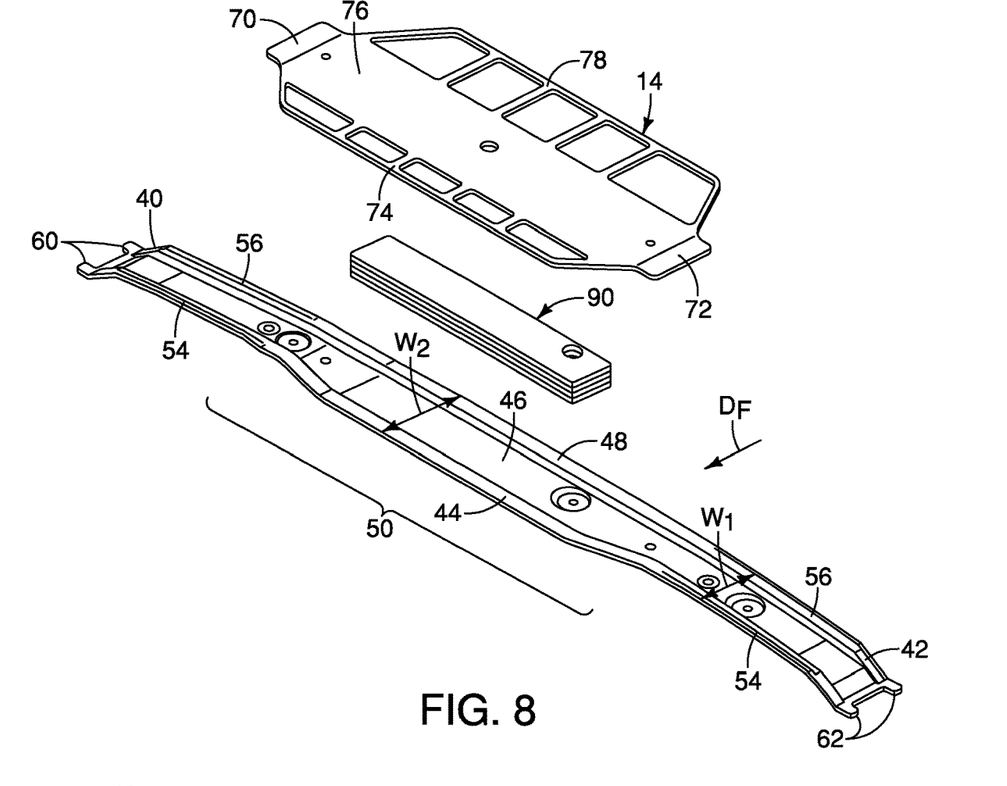
FIG. 8 is an exploded perspective view of the roof bow, the vibration dampening plate and the weighted member in accordance with the first embodiment.
Figure 9:
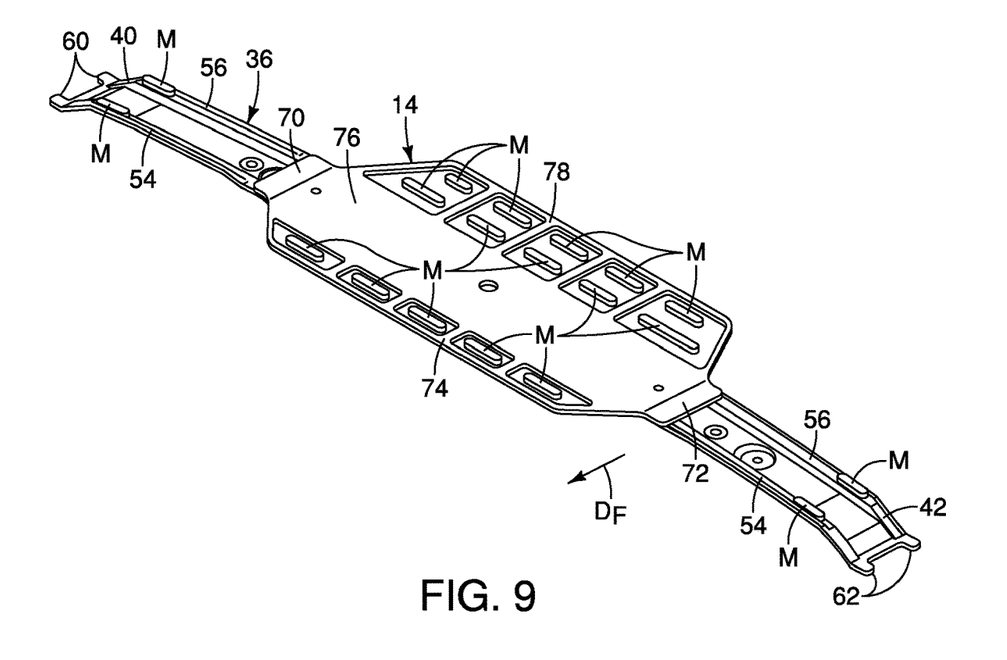
FIG. 9 is a perspective view of the roof bow, the vibration dampening plate and the weighted member shown fully assembled in accordance with the first embodiment.

The roof bow 36 defines a central section 50 that is located between the first end 40 and the second end 42. The central section 50 of the roof bow 36 is substantially covered by the vibration dampening plate 14 with the vibration dampening plate 14 installed to the roof bow 36, as shown in FIGS. 8 and 9. As shown in FIG. 6, the majority of the central section 50 is wider than the first and second ends 40 and 42 of the roof bow 36. More specifically, as shown in FIGS. 6 and 8, the first and second ends 40 and 42 of the roof bow 36 define a first width $W_1$ of the roof bow 36. Further, the central section 50 defines a second width $W_2$ that is greater than the first width $W_1$.

Figure 7:
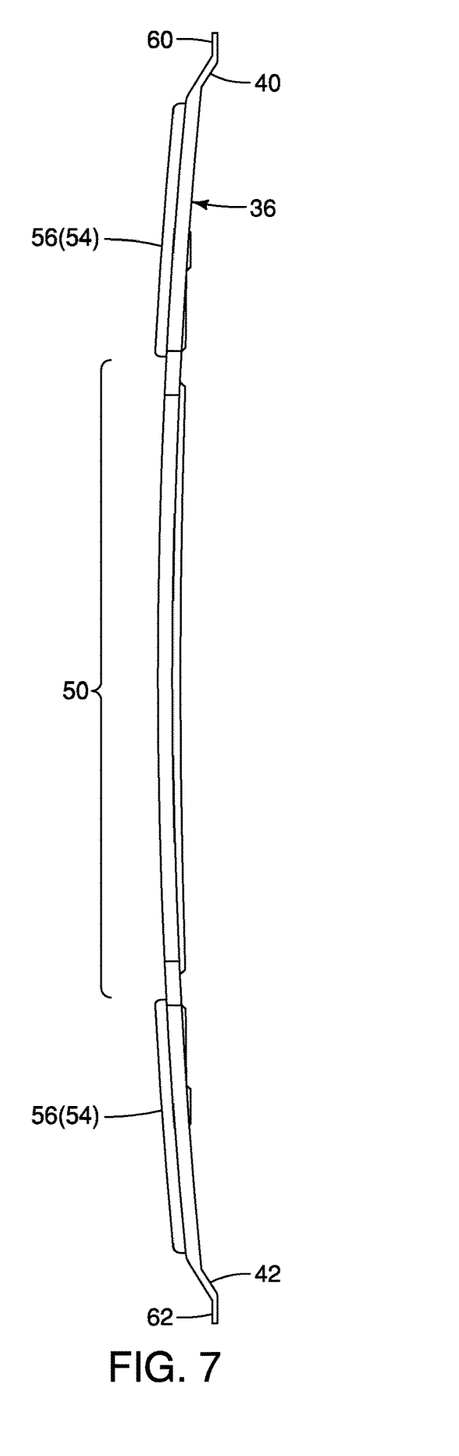
FIG. 7 is a side view of the roof bow depicted in FIG. 6 in accordance with the first embodiment.

As is also shown in FIGS. 6-9, the forward flange section 44 at the first end 40 and second end 42 includes embossments 54 and the rearward flange section 48 includes embossments 56. The embossments 54 and 56 are not formed on the forward flange section 44 or the rearward flange section 48 along the central section 50 of the roof bow, as shown in FIGS. 6, 7 and 8. The embossments 54 are formed along respective forward edges of the first and second ends 40 and 42 of the forward flange section 44, and the embossments 56 are formed along respective rearward edges of the first and second ends 40 and 42 of the rearward flange section 48.

As shown in FIG. 5, an upper surface of the recessed area 46 is located below respective upper surfaces of the forward and rearward flange sections 44 and 48 by a distance $D_1$. In other words, the depth of the recessed area 46 is the distance $D_1$.

Further, the roof bow 12 further includes a pair of first attachment projections 60 that extending from the first end 40 of the roof bow 12. The roof bow 12 further includes a pair of second attachment projections 62 that extend from the second end 42 of the roof bow 12. The pair of first attachment projections 60 and the pair of second attachment projections 62 are attached via welding techniques to respective ones of the roof side rails 20 at the bottom of or beneath roof ditches 39.

The vibration dampening plate 14 is described in greater detail below with reference to FIGS. 8-14.

As shown in FIGS. 4, 5 and 9, the vibration dampening plate 14 is installed to upper surfaces of the forward and rearward flange sections 44 and 48 of the roof bow 36. More specifically, the vibration dampening plate 14 is welded via welds $T_1$ the forward flange section 44 and the rearward flange section 48 of the roof bow 36, as shown in FIG. 5. The attachment between the vibration dampening plate 14 and the roof bow 36 is proximate and covering the central section 50 of the roof bow 36 at a location that is spaced apart from the first end 40 and the second end 42 of the roof bow 36.

Figure 10:
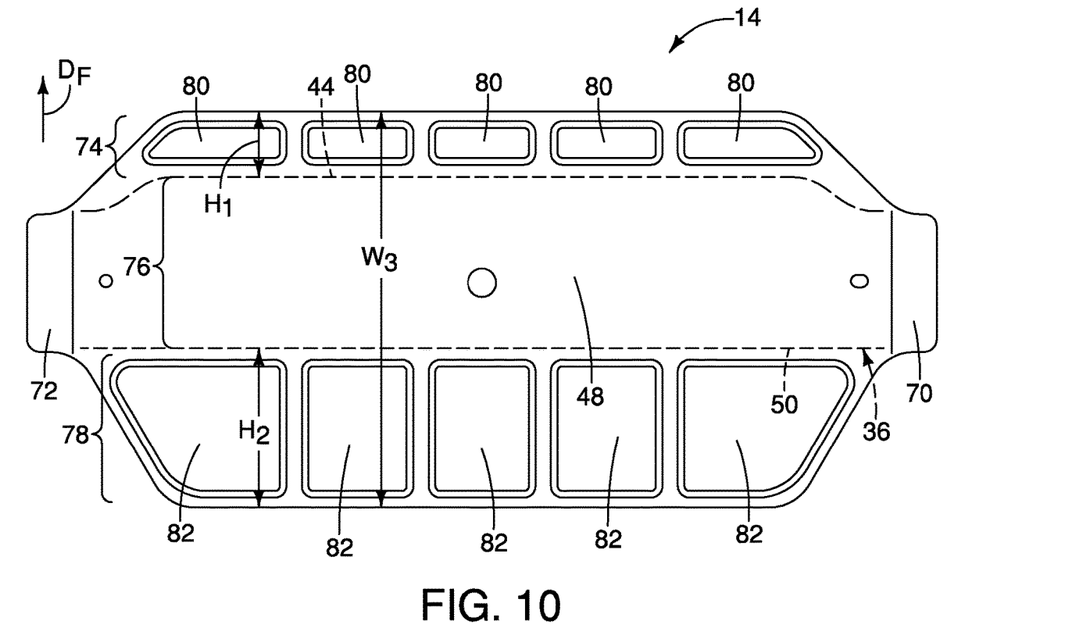
FIG. 10 is a top view of the vibration dampening plate in accordance with the first embodiment.
Figure 11:
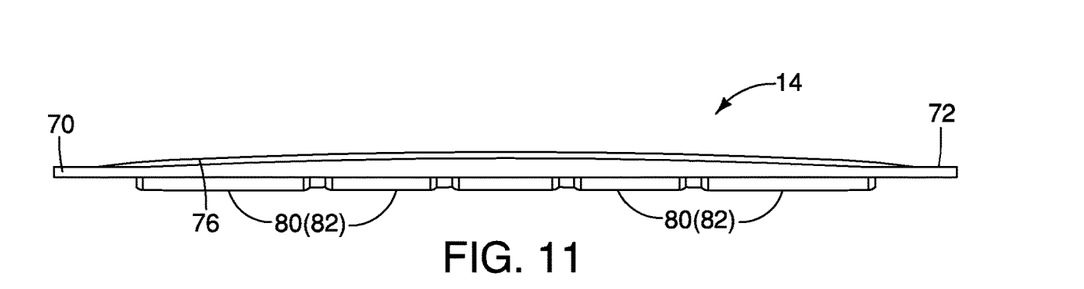
FIG. 11 is a side view of the vibration dampening plate in accordance with the first embodiment.
Figure 12:
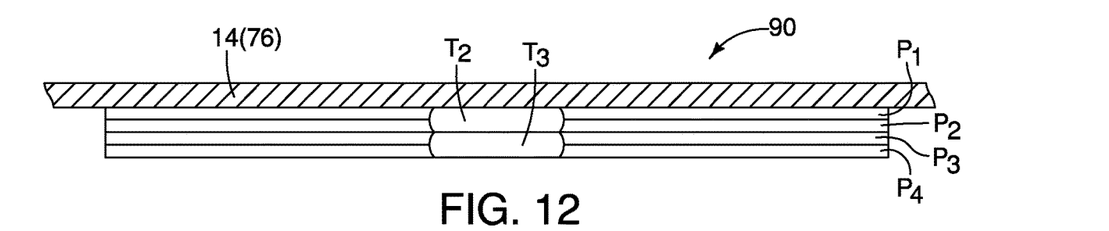
FIG. 12 is a cross-sectional view of the vibration dampening plate showing the weighted member attached to the underside thereof in accordance with the first embodiment.
Figure 13:
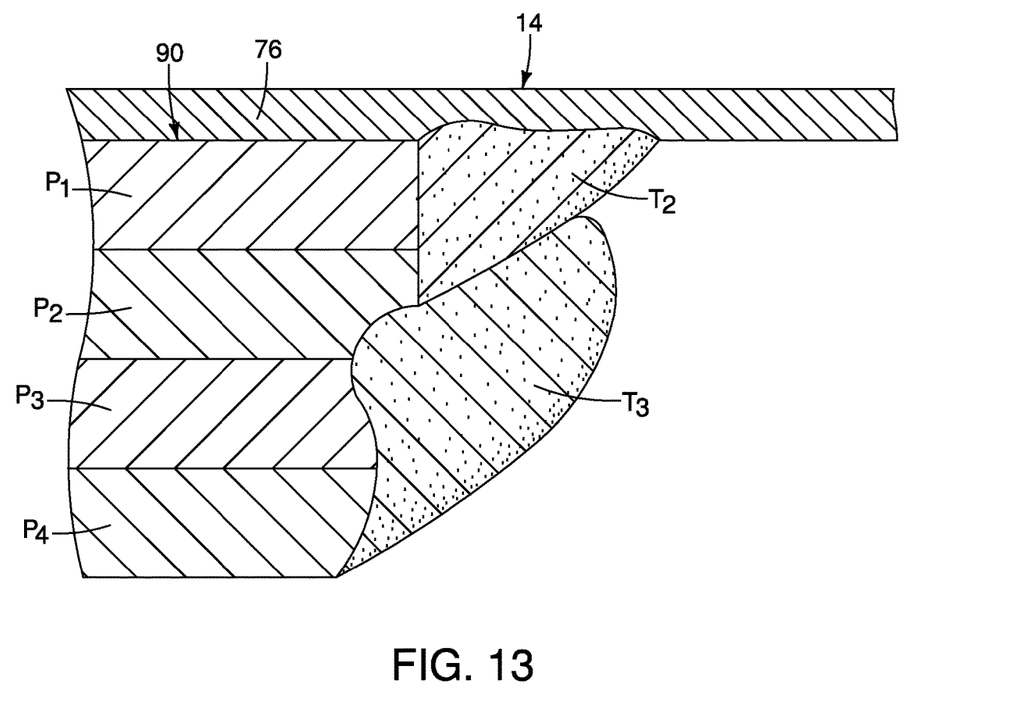
FIG. 13 is another cross-sectional view of the vibration dampening plate showing the weighted member showing a first weld and a second weld that hold four layers or plates of the weighted member together and to the vibration dampening plate in accordance with the first embodiment.
Figure 14:
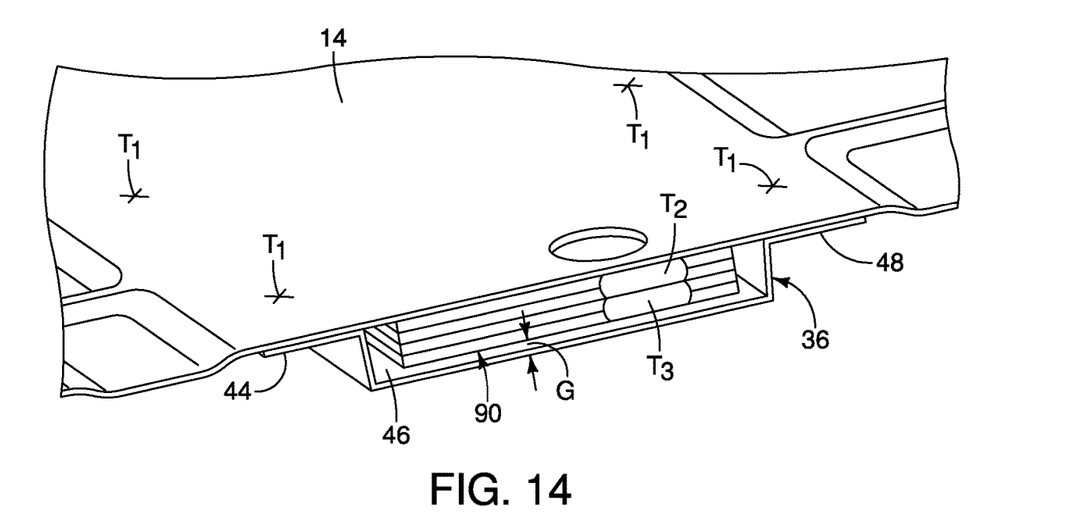
FIG. 14 is yet another cross-sectional view of the vibration dampening plate showing the weighted member, the first weld and the second weld in accordance with the first embodiment.

As shown in FIGS. 8, 9 and 10, the vibration dampening plate 14 includes a first lateral end 70, a second lateral end 72, a forward portion 74, a central portion 76 and a rearward portion 78. As shown in FIGS. 4, 5 and 9, the central portion 76 is fixedly attached to the roof bow 36.

The rearward portion 78 is larger than the forward portion 74 of the rearward portion 78 of the vibration dampening plate 14. Further, the forward portion 74 includes first embossments 80 that are concaved relative to an upper surface of the vibration dampening plate 14. The rearward portion 78 includes second embossments 82 that are also concaved relative to an upper surface of the vibration dampening plate 14. The second embossments 82 are larger than the first embossments 80.

As shown in FIG. 10, the forward portion 74 extends a first distance $H_1$ (an overhanging or cantilevered section) forward of the forward flange section 44 of the roof bow 36. The rearward portion 78 extends a second distance $H_2$ (an overhanging or cantilevered section) rearward of the rearward flange section 48. The second distance $H_2$ is greater than the first distance $H_1$.

As measured between the forward portion 74 and the rearward portion 78, the vibration dampening plate 14 defines a third overall width $W_3$ that is greater than the first and second widths $W_1$ and $W_2$ of the roof bow 36.

The vibration dampening plate 14 includes a weighted member 90 that is welded via weld $T_2$ to a lower surface or underside of the vibration dampening plate 14, as shown in FIGS. 5, 8, 13 and 14.

The weighted member 90 can be a solid single metal beam or ingot, or, as depicted in FIGS. 5, 8 and 12-14, can be formed of four layers of metal plates $P_1$, $P_2$, $P_3$ and $P_4$ that are welded together by weld $T_2$ and $T_3$. The weighted member 90 is fixedly attached to the lower surface of the vibration dampening plate 14 such that the weighted member 90 is at a level above the upper surface of the recessed area 46 of the first roof bow 36 with a non-contacting relationship with the first roof bow 36. More specifically, a gap G is defined between the surfaces of the first roof bow 36 that define the recessed area 46 and the weighted member 90. Put another way, the weighted member 90 is attached to the vibration dampening plate 14 such that the weighted member 90 extends over the central section 50 (the recessed area 46) of the roof bow 36 between the forward flange section 44 and the rearward flange section 48.

In the depicted embodiment, the weighted member 90 includes the four elongated metallic members $P_1$, $P_2$, $P_3$ and $P_4$ or plates $P_1$, $P_2$, $P_3$ and $P_4$ that are welded such that a first and second ones $P_1$ and $P_2$ of the four elongated metallic members $P_1$, $P_2$, $P_3$ and $P_4$ are welded to one another and to the vibration dampening plate 14 by a first weld layer $T_2$. Further, the second, third and fourth ones $P_2$, $P_3$ and $P_4$ of the four elongated metallic members $P_1$, $P_2$, $P_3$ and $P_4$ are welded to one another by a second weld layer $T_3$ that overlaps the first weld layer $T_2$.

Although a single metallic mass can be used as the weighted member 90, an advantage of using the four plates $P_1$, $P_2$, $P_3$ and $P_4$ is that manufacturing costs are reduced and assembly is simpler. Further, depending upon the design of the vehicle 10 and the resonance frequency of the vehicle 10, it is possible only three of the plates $P_1$, $P_2$, $P_3$ and $P_4$ are required to change the resonance frequency of the rearward areas of the vehicle 10. For example, in some applications the weighted member 90 may require only two elongated metallic members $P_1$ and $P_2$.

As shown in FIGS. 5, 8, 13 and 14, the plates $P_1$ and $P_2$ welded to one another and welded to the vibration dampening plate 14 via the first weld $T_2$. After this weld is made, the plates $P_3$ and $P_4$ are then welded together and welded to the plate $P_2$. These welding steps ensure reliable welding of the plates $P_1$, $P_2$, $P_3$ and $P_4$ and reduces the possibility of warpage of the plates $P_1$, $P_2$, $P_3$ and $P_4$ during the welding process. It should be understood that the plates $P_1$, $P_2$, $P_3$ and $P_4$ are welded to the vibration dampening plate 14 and to one another at several locations along an outer periphery of the plates $P_1$, $P_2$, $P_3$ and $P_4$, depending upon their overall dimensions and the dimensions of the vibration dampening plate 14.

Figure 15:
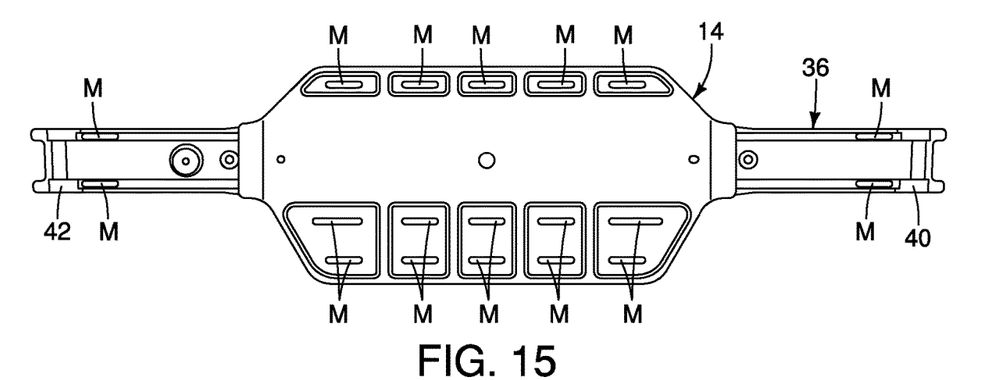
FIG. 15 is a top view of the vibration dampening plate attached to the roof bow showing an adhesive or mastic material at predetermined locations along the upper surface of the vibration dampening plate in accordance with the first embodiment.
Figure 16:
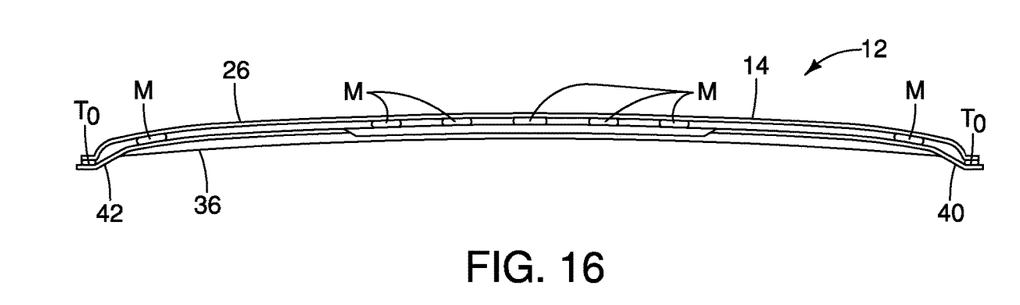
FIG. 16 is a side view of the vibration dampening plate, the roof bow and a roof panel with the adhesive or mastic material adhering the vibration dampening plate to the roof panel in accordance with the first embodiment.

As shown in FIGS. 15 and 16, a mastic material M (or an adhesive material) is applied at predetermined locations along the vibration dampening plate 14 and near the first and second ends 40 and 42 adjacent to the embossments 54 and 56. Thereafter, the roof bow 36 and vibration dampening plate 14 are installed to the roof panel 26 (or vise verse). The mastic M fixes the roof bow 36 and vibration dampening plate 14 to a rearward area of the roof panel 26. The mass of the weighted member 90 being adhered to the roof panel 26 via the vibration dampening plate 14 attenuates the resonance frequency of the roof structure 12. The passenger compartment 18 is quieter and more comfortable as a result, in particular, near a rearward area of the passenger compartment 18.

Since the weighted member 90 is fixed to the vibration dampening plate 14 and hence to the roof panel 26, and is further spaced apart from the adjacent portions of the roof bow 36, the attenuating capability of the weighted member 90 and the vibration dampening plate 14 are enhanced, as comparted to having the weighted member 90 attached to the roof bow 36.

Second Embodiment

Figure 17:
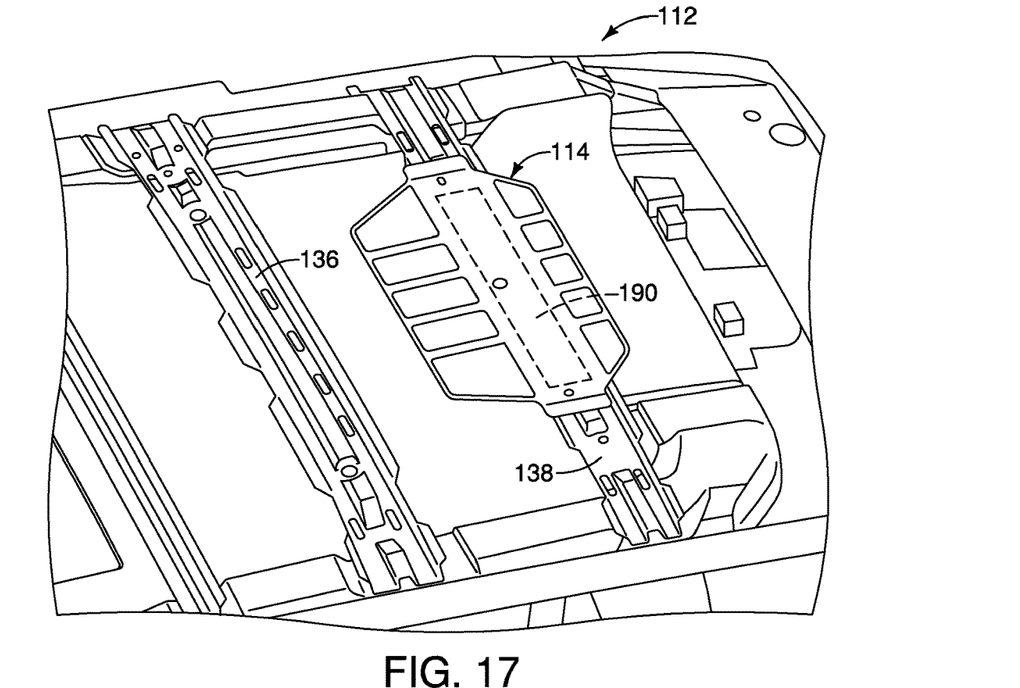
FIG. 17 is a perspective view of a rearward area of a roof structure showing the two rearmost roof bows, with the rearward-most one of the roof bows having a vibration dampening plate attached thereto in accordance with a second embodiment.

Referring now to FIG. 17, a roof structure 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The roof structure 112 includes a plurality of roof bows, as described above with reference to the first embodiment. However, in the second embodiment, the rearmost roof bow 138 is provided with a vibration dampening plate 114 that includes a weighted member 190 fixed to the lower surface of the vibration dampening plate 114. The vibration attenuating properties of the vibration dampening plate 114 and the weighted member 190 are similar if not the same as the vibration dampening plate 14 and weighted member 90 of the first embodiment. The overall dimensions and construction of the vibration dampening plate 114 and weighted member 190 are basically the same or identical to that of the vibration dampening plate 14 and weighted member 90 of the first embodiment. However, in the second embodiment, the vibration dampening plate 114 is rotated 180 degrees, as compared to the first embodiment. Therefore, the forward portion the vibration dampening plate 114 extends a first distance forward of the forward flange section of the roof bow 136 and the rearward portion of the vibration dampening plate 114 extends a second distance rearward of the rearward flange section of the roof bow with the first distance being greater than the second distance. This is the opposite of those relationships in the first embodiment.

Third Embodiment

Figure 18:
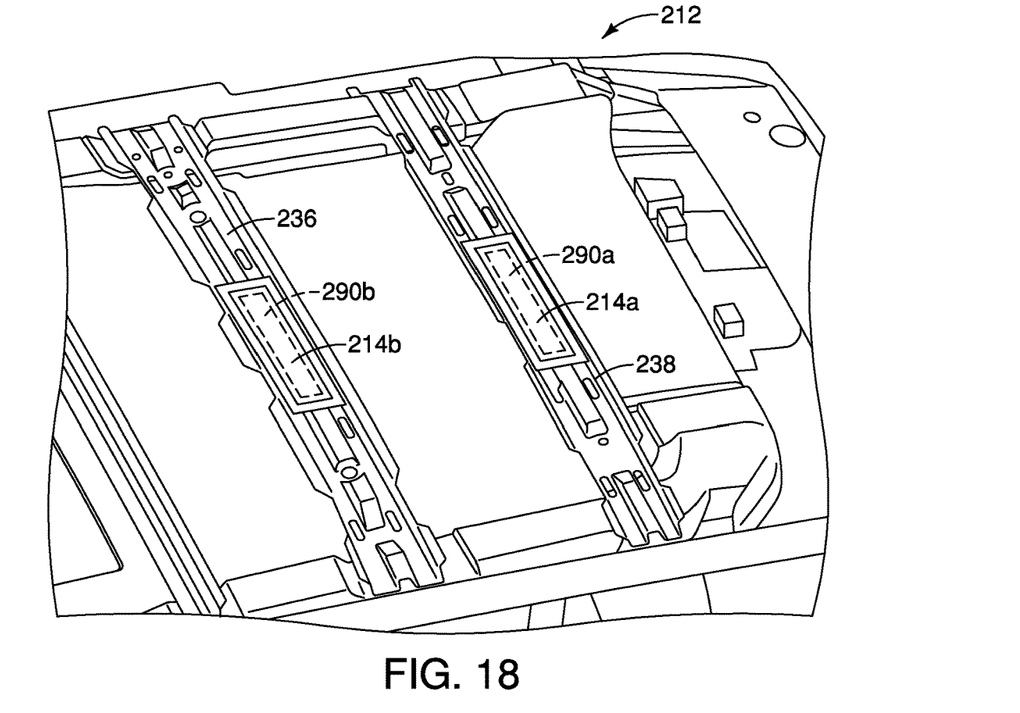
FIG. 18 is a perspective view of a rearward area of a roof structure showing the two rearmost roof bows, each of the two roof bows having a corresponding vibration dampening plate attached thereto in accordance with a third embodiment.

Referring now to FIG. 18, a roof structure 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, a pair of vibration dampening plates 214a and 214b are installed to the rearward-most roof bows of the roof structure 212. Specifically, the vibration dampening plate 214a is attached to the roof bow 238 and the vibration dampening plate 214b is attached to the roof bow 236. Each of the vibration dampening plates 214a and 214b includes respective weighted members 290a and 290b attached to undersides thereof (spaced apart from the roof bows 238 and 236).

The vibration attenuating properties of the vibration dampening plates 214a and 214b and their respective and the weighted member 290a and 290b are similar if not the same as the vibration dampening plate 14 and weighted member 90 of the first embodiment.

Fourth Embodiment

Figure 19:
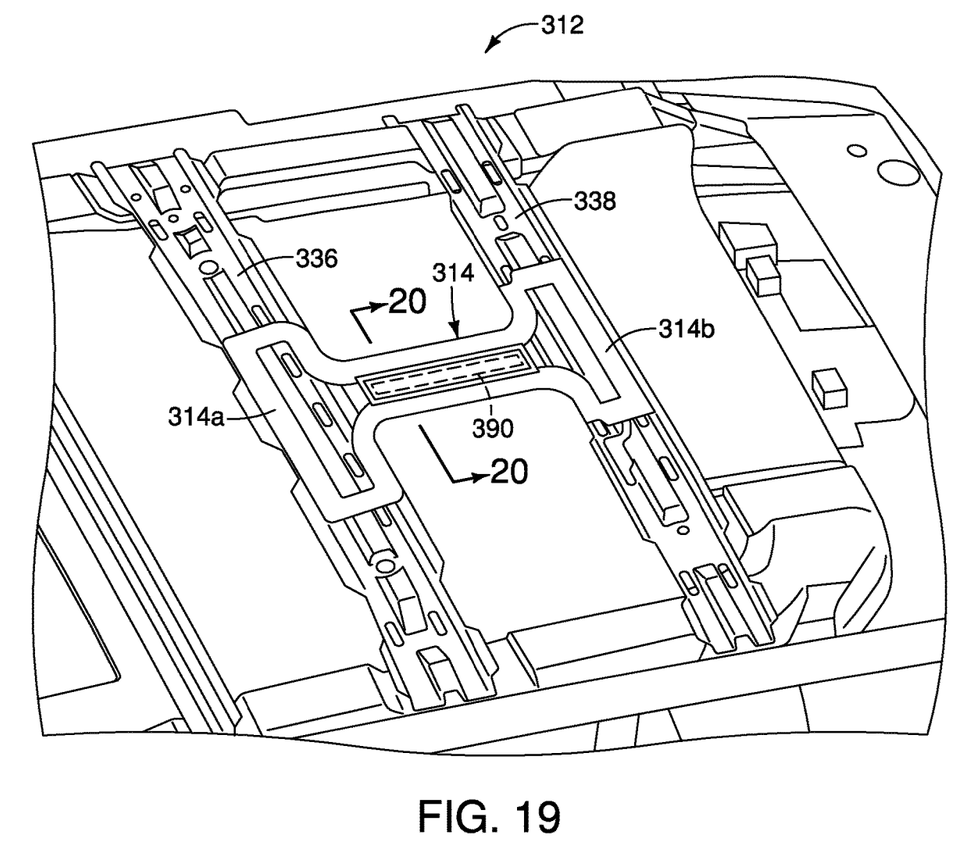
FIG. 19 is a perspective view of a rearward area of a roof structure showing the two rearmost roof bows with a vibration dampening plate attached to both of the roof bows and extending between the roof bows in accordance with a fourth embodiment.
Figure 20:
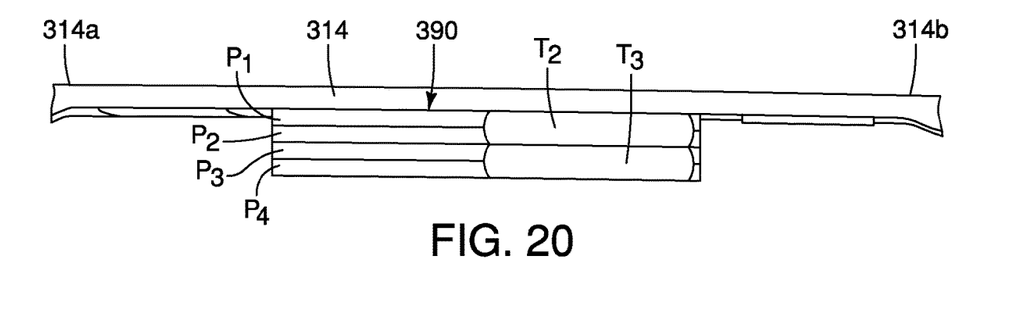
FIG. 20 is a cross-sectional view of the vibration dampening plate taken along the line 20-20 in FIG. 19, showing a weighted member attached to a lower surface of the vibration dampening plate in accordance with a fifth embodiment.

Referring now to FIGS. 19 and 20, a roof structure 312 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, a vibration dampening plate 314 has a forward end 314a and a rearward end 314b. The forward end 314a is fixed to the roof bow 336 and the rearward end 314b is fixed to the roof bow 338. The roof bows 336 and 338 are the rearmost roof bows of the roof structure 312.

The vibration dampening plate 314 includes a weighted member 390 that is fixed to the underside or lower surface of the vibration dampening plate 314 via welds $T_2$ and $T_3$, as shown in FIG. 20. However, the weighted member 390 is located between and spaced apart from the roof bows 336 and 338.

The vibration attenuating properties of the vibration dampening plate 314 and corresponding weighted member 390 is similar if not the same as the vibration dampening plate 14 and weighted member 90 of the first embodiment.

Fifth Embodiment

Figure 21:
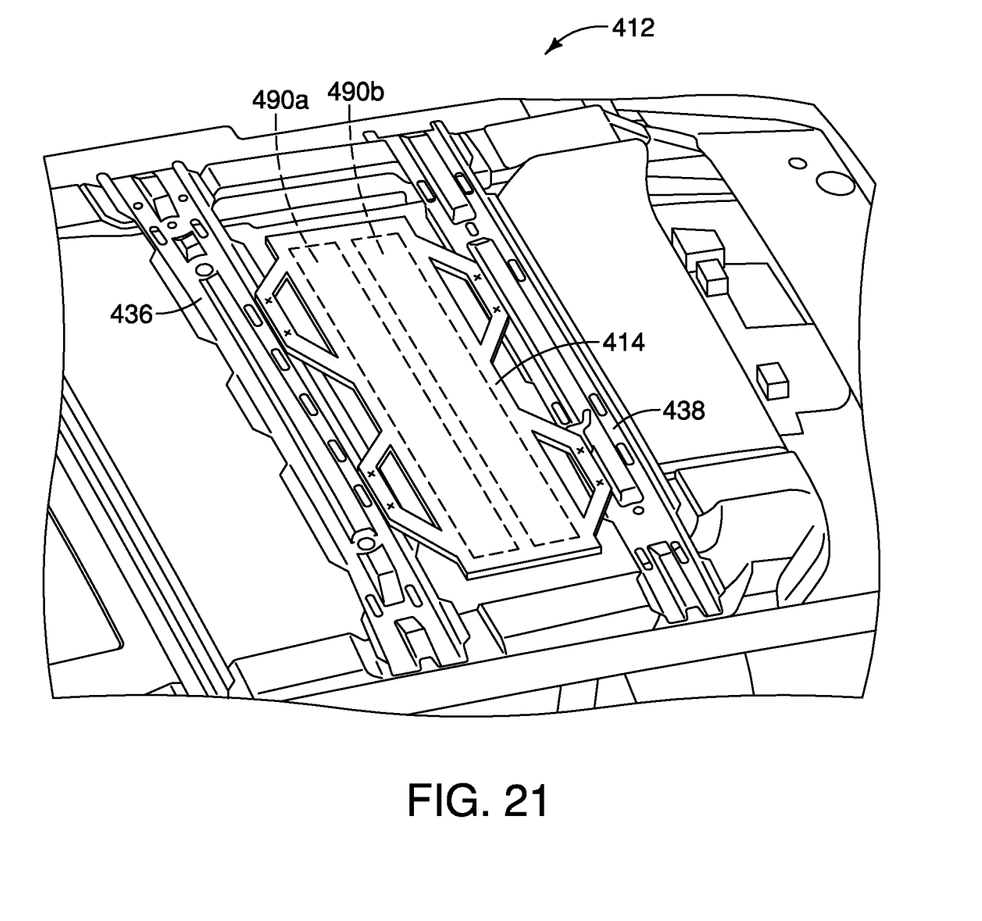
FIG. 21 is a perspective view of a rearward area of a roof structure showing the two rearmost roof bows with a vibration dampening plate attached to both of the roof bows and extending between the roof bows in accordance with a sixth embodiment.

Referring now to FIG. 21, a roof structure 412 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, a vibration dampening plate 414 has a forward sections that are fixed to the roof bow 436 and rearward sections that are fixed to the roof bow 438. The roof bows 436 and 438 are the rearmost roof bows of the roof structure 412.

The vibration dampening plate 414 includes one or more weighted members (for example 490a and 490b) that are fixed to the underside or lower surface of the vibration dampening plate 414. However, the weighted members 490a and 490b are located between and spaced apart from the roof bows 436 and 438.

The vibration attenuating properties of the vibration dampening plate 414 and corresponding weighted members 490a and 490b are similar if not the same as the vibration dampening plate 14 and weighted member 90 of the first embodiment.

The vehicle body structures of the vehicle 10 (other than the roof structure) are conventional components that are well known in the art. Since such vehicle body structures are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle roof structure. Accordingly, these terms, as utilized to describe the present invention should be interpreted relative to a vehicle equipped with the vehicle roof structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle roof structure, comprising:
    a roof bow configured and dimension to install to opposing roof rails of a vehicle body structure, the roof bow having a first end and a second end, a first overall length being measured from the first end to the second end and a first overall width being measured perpendicular to the first overall length, the roof bow having a forward flange section, a rearward flange section and a central section that extend in a lengthwise direction of the roof bow between the first end and the second end, where forward and rearward directions are defined relative to a forward and rearward directions of the vehicle body structure, the central section defining a recessed area having an upper surface that is lower than respective upper surfaces of the forward and rearward flange sections;
    a vibration dampening plate installed to an upper surface of the roof bow proximate the central section of the roof bow spaced apart from the first end and the second end of the roof bow; and
    a weighted member fixedly attached to a lower surface of the vibration dampening plate such that the weighted member is at a level above the upper surface of the recessed area of the roof bow with a non-contacting relationship with the roof bow.

2. The vehicle roof structure according to claim 1, wherein
    the vibration dampening plate defines a second overall width that is greater than the first overall width.

3. The vehicle roof structure according to claim 2, wherein
    the vibration dampening plate includes a forward portion, a central portion and a rearward portion, with the central portion being fixedly attached to the roof bow, such that the forward portion extends forward of the forward flange section and the rearward portion extends rearward of the rearward flange section.

4. The vehicle roof structure according to claim 3, wherein
    the forward portion extends a first distance forward of the forward flange section and the rearward portion extends a second distance rearward of the rearward flange section, the first distance being greater than the second distance.

5. The vehicle roof structure according to claim 3, wherein
    the forward portion extends a first distance forward of the forward flange section and the rearward portion extends a second distance rearward of the rearward flange section, the second distance being greater than the first distance.

6. The vehicle roof structure according to claim 1, wherein
    the weighted member includes at least two elongated metallic members welded to one another and to the vibration dampening plate.

7. The vehicle roof structure according to claim 6, wherein
    the at least two elongated metallic members include four elongated metallic members welded to one another.

8. The vehicle roof structure according to claim 7, wherein
    the four elongated metallic members are welded such that a first and second ones of the four elongated metallic members are welded together and to the vibration dampening plate by a first weld layer, and, the second, third and fourth ones of the four elongated metallic members are welded to one another by a second weld layer that overlaps the first weld layer.

9. The vehicle roof structure according to claim 1, wherein
    the weighted member includes the four elongated metallic members that are welded such that a first and second ones of the four elongated metallic members are welded together and to the vibration dampening plate by a first weld layer, and, the second, third and fourth ones of the four elongated metallic members are welded to one another by a second weld layer that overlaps the first weld layer.

10. The vehicle roof structure according to claim 1, wherein
    the weighted member is attached to the vibration dampening plate such that the weighted member extends over the central section of the roof bow between the forward flange section and the rearward flange section.

11. A vehicle roof structure, comprising:
    a pair of roof side rails extending in a vehicle longitudinal direction, the pair of roof side rails at least partially defining a roof ditch;
    a first roof bow having a first end and a second end, the first roof bow extending between and supported to the pair of roof side rails in a direction perpendicular to the vehicle longitudinal direction, the first roof bow having a forward flange section, a rearward flange section and a central section that extend in a lengthwise direction of the first roof bow between the first end and the second end and defining a recessed area having an upper surface that is lower than respective upper surfaces of the forward and rearward flange sections; and a vibration dampening plate installed to an upper surface of the first roof bow proximate the central section of the first roof bow spaced apart from the first end and the second end of the first roof bow; and a weighted member fixedly attached to a lower surface of the vibration dampening plate such that the weighted member is at a level above the upper surface of the recessed area of the first roof bow with a non-contacting relationship with the first roof bow.

12. The vehicle roof structure according to claim 11, wherein predetermined areas of the vibration dampening plate are provided with an adhesive or mastic material thereby fixing the first roof bow to a roof panel installed above the first roof bow, the roof panel further being attached to the roof side rails proximate the roof ditch.

13. The vehicle roof structure according to claim 11, wherein the weighted member includes the four elongated metallic members that are welded such that a first and second ones of the four elongated metallic members are welded together and to the vibration dampening plate by a first weld layer, and, the second, third and fourth ones of the four elongated metallic members are welded to one another by a second weld layer that overlaps the first weld layer.

14. The vehicle roof structure according to claim 11, wherein the weighted member is attached to the vibration dampening plate such that the weighted member extends over the central section of the roof bow between the forward flange section and the rearward flange section.

15. A vehicle roof structure, comprising:

a first roof bow configured and dimension to install to opposing roof rails of a vehicle body structure, the first roof bow having a first end and a second end, a first overall length being measured from the first end to the second end and a first overall width being measured perpendicular to the first overall length, the first roof bow having a forward flange section, a rearward flange section and a central section that extend in a lengthwise direction of the first roof bow between the first end and the second end, where forward and rearward directions are defined relative to a forward and rearward directions of the vehicle body structure, the central section defining a recessed area having an upper surface that is lower than respective upper surfaces of the forward and rearward flange sections;

a vibration dampening plate installed to at least an upper surface of the rearward flange section proximate the central section of the first roof bow spaced apart from the first end and the second end of the first roof bow;

a second roof bow located rearward of the first roof bow such that a portion of vibration dampening plate extends rearward from the first roof bow, the portion of the vibration dampening plate being attached to a central section of the second roof bow; and a weighted member located in an area between the first roof rail and the second roof rail and being fixedly attached to a lower surface of the vibration dampening plate such that the weighted member has a non-contacting relationship with the first roof bow and the second roof bow.

16. The vehicle roof structure according to claim 11, further comprising a second roof bow located rearward of the first roof bow;

a second vibration dampening plate attached to the second roof bow; and a second weighted member attached to an underside of the second vibration dampening plate.

* * * * *